United States Patent [19]

Chebra

[11] Patent Number: 4,527,235
[45] Date of Patent: Jul. 2, 1985

[54] SUBSCRIBER TERMINAL POLLING UNIT

[75] Inventor: Ronald J. Chebra, Mercerville, N.J.

[73] Assignee: Base Ten Systems, Inc., Trenton, N.J.

[21] Appl. No.: 475,470

[22] Filed: Mar. 15, 1983

[51] Int. Cl.³ ............................................. G06F 11/20
[52] U.S. Cl. ............................... 364/200; 340/825.06;
 371/9
[58] Field of Search ..................... 340/825.06;
 364/200 MS File, 900 MS File; 455/9, 3; 371/9

[56] References Cited

U.S. PATENT DOCUMENTS 3,618,045 11/1971 Campbell et al. .................... 364/200
4,256,926 3/1981 Pitroda .
4,358,823 11/1982 McDonald et al. .................... 371/9
4,412,281 10/1983 Works ................................. 364/200
4,466,098 8/1984 Southard .

Primary Examiner—James D. Thomas
Assistant Examiner—David Y. Eng
Attorney, Agent, or Firm—Weiser & Stapler

[57] ABSTRACT

A subscriber services system polling unit in which microprocessors, each primarily responsible for controlling the polling of half the subscriber terminals, may be switched to also control the polling of the other half of the subscriber terminals.

6 Claims, 2 Drawing Figures

SECTION A

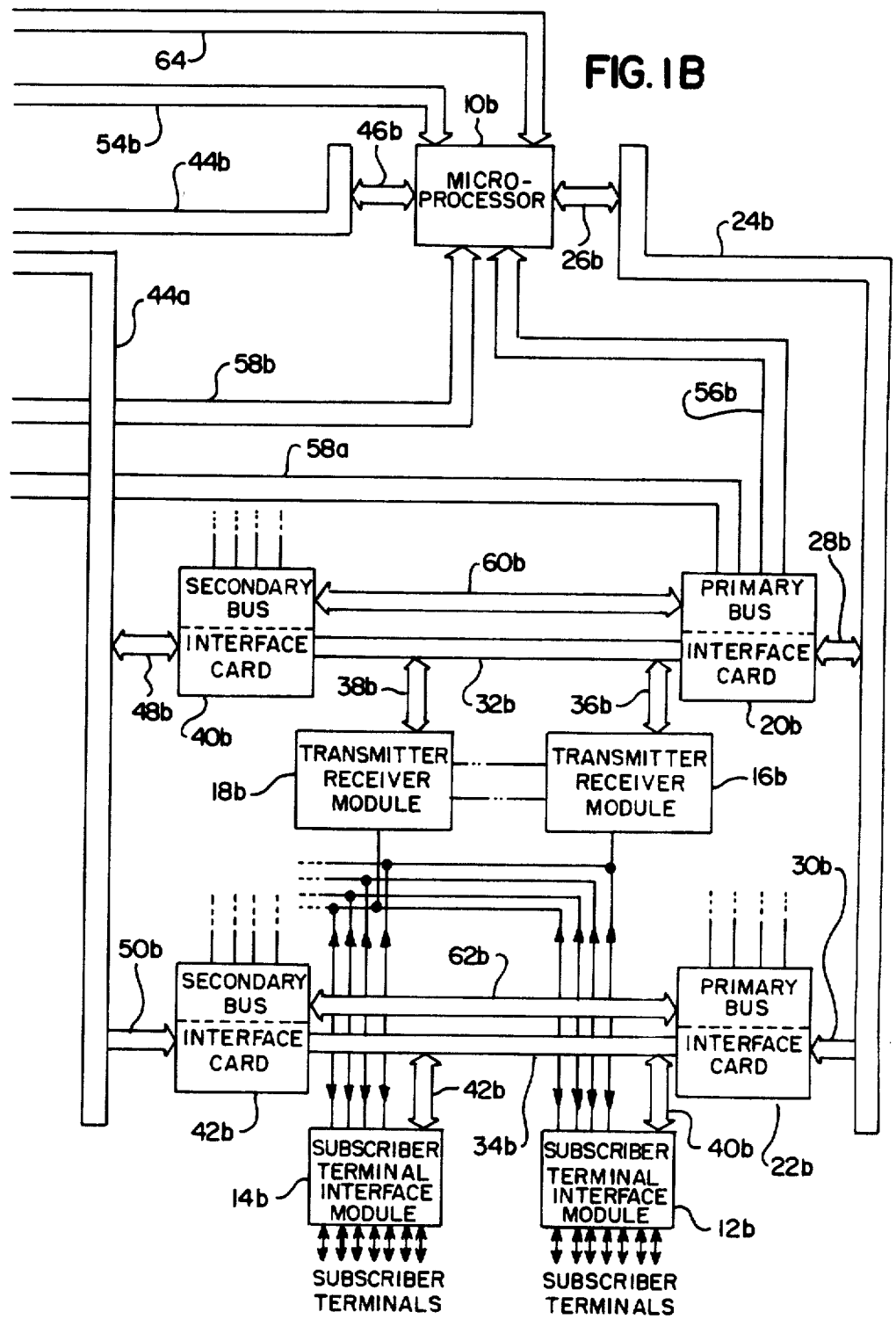

SUBSCRIBER TERMINAL POLLING UNIT

BACKGROUND OF THE INVENTION

The present invention relates to systems for utilizing telephone networks to provide additional functions, beyond those of traditional telephone service involving conversations between subscribers. More particularly, the invention relates to such systems in which the network is additionally used to monitor the conditions of one or more instrumentalities, located at the subscribers' premises.

U.S. patent application Ser. No. 327,486, filed Dec. 4, 1981, assigned to the same Assignee as the present application and hereby incorporated by reference, is directed to a system which utilizes a telephone network to "poll" one or more instrumentalities, such as fire alarms and burglar alarms, located at the premises of the telephone subscribers to determine the status of any particular instrumentality. Interrogation signals are transmitted via the telephone lines to terminals, referred to as subscriber terminal units or STU's in application Ser. No. 327,486, and the nature of the response indicates the status of the monitored instrumentality. If an alarm condition is sensed, an appropriate agency, such as the local fire department or police precinct, is notified. The system described in application Ser. No. 327,486 is but one of many such systems which have been proposed previously.

The polling unit, identified as the scanner in application Ser. No. 327,486, is the source of the interrogation signals which are transmitted to the subscriber terminals to determine the status of the instrumentalities being monitored. The polling unit also provides the indications of alarm conditions. In addition, the polling unit performs other complex functions, such as the prioritized selection of particular subscriber terminals to be interrogated, the assignment of components which generate a sequence of interrogations and the frequency of interrogations. In performing all of these functions, the polling unit develops a history of the responses from the subscriber terminals by storing the responses.

The polling unit should be arranged not only to identify alarm conditions of the monitored instrumentalities, but it also should detect breakdowns and malfunctions within itself. Preferably, a defective or malfunctioning component or portion of the polling unit is automatically taken out of the system and a fully operational replacement is automatically substituted. In this manner the polling unit operates continuously with the result that the subscribers receive uninterrupted, effective surveillance of the instrumentalities at their premises.

The replacement of malfunctioning components within the polling unit preferably is conducted on a selective basis rather than by full-scale substitution of one entire polling unit for another. By substituting selectively, more malfunctions can be overcome with only one back-up unit than when the entire back-up unit is substituted on the occurrence of a single malfunction.

SUMMARY OF THE INVENTION

It is an object of the present invention to provide a new and improved system for monitoring the status of instrumentalities at the premises of telephone subscribers.

It is another object of the present invention to provide a subscriber services system polling unit arranged for redundant operation, so that the unit can continue to function in a normal manner even when parts become defective or malfunction.

It is a further object of the present invention to provide a subscriber services system polling unit in which the redundant operation is achieved by use of components already in the system and normally used to perform other functions.

It is yet another object of the present invention to provide a subscriber services system polling unit in which redundant operation is achieved by selective replacement of malfunctioning components.

A subscriber services system polling unit, constructed in accordance with the present invention, is arranged in two identical half sections, with each section primarily responsible for half the subscriber terminals and secondarily responsible for the other half of the subscriber terminals. Each section includes microprocessor means for controlling the polling of that portion of the subscriber terminals for which it is primarily responsible and for storing responses from those subscriber terminals. Associated polling means are operated in response to control signals applied through primary interface means to interrogate the associated half of the subscriber terminals and to receive responses from the subscriber terminals which are conducted through the primary interface means back to the microprocesor means for storage and subsequent utilization. Secondary interface means are provided between each microprocessor means and the polling means of the other section of the unit, so that the microprocessor means in one section of the unit can take over control of the other polling means to interrogate the subscriber terminals associated with the other half of the system and to store responses from these other subscriber terminals. The control of the polling means in each section by either microprocessor means may be effected manually, but preferably automatically when a malfunction is detected and the other half of the system must take over the polling of the subscriber terminals for which the malfunctioning part was initially responsible.

As an added degree of protection in case of malfunction, the responses from each subscriber terminal are normally stored in both the microprocessor means responsible for the particular subscriber terminal and in the microprocessor means responsible for the other half of the subscriber terminals. In this way, whenever one microprocessor means must take over for the other, all previous responses from the subscriber termimals for which the microprocessor means has now become additionally reponsible are already stored in that same microprocessor means.

DESCRIPTION OF THE DRAWING

FIGS. 1A and 1B show a block diagram of a subscriber services system polling unit.

DESCRIPTION OF THE PREFERRED EMBODIMENT

Figure 1A:
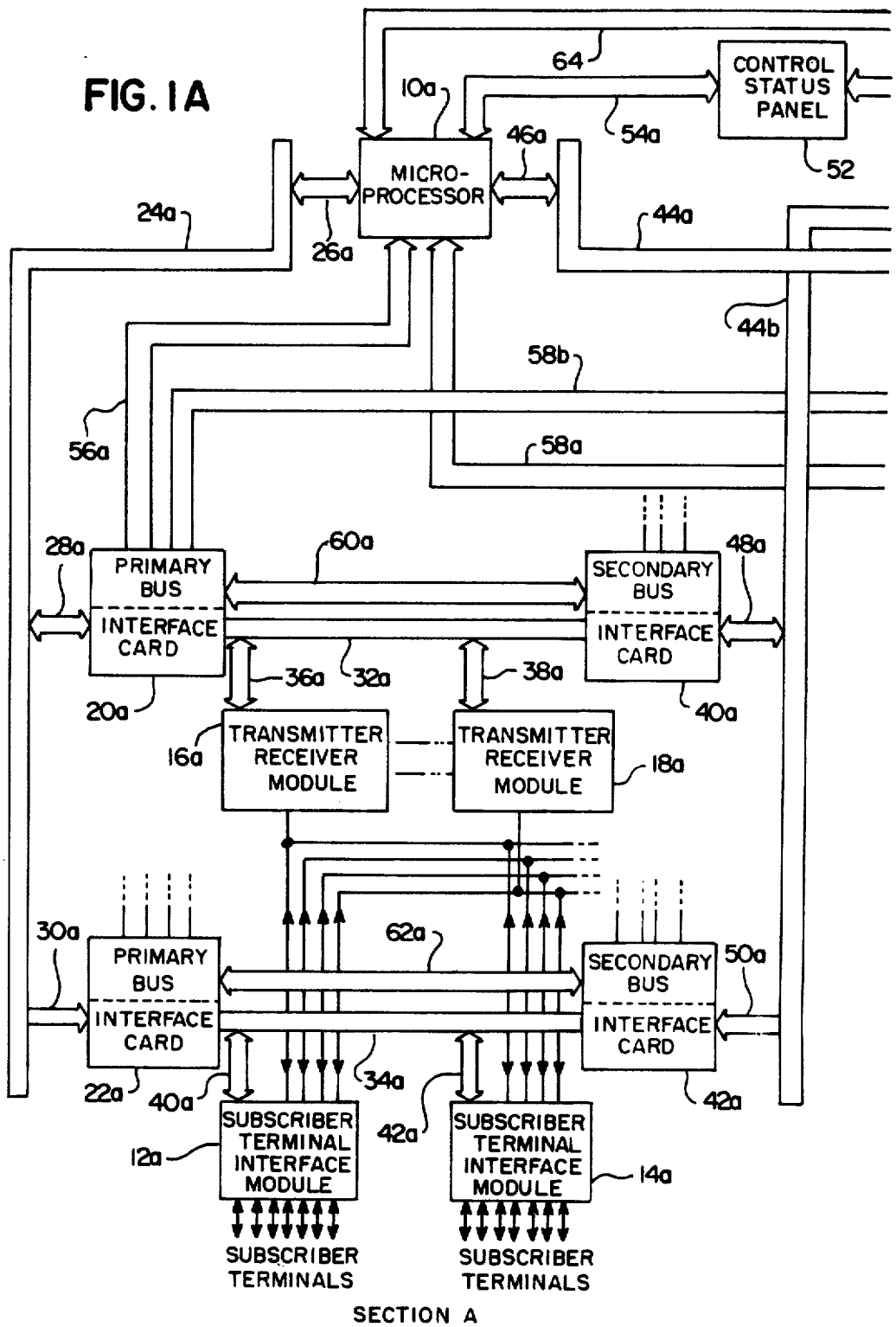

Referring to the drawings, there is shown a block diagram of a subscriber services system polling unit constructed in accordance with the present invention. This unit performs the general functions of scanner 18 in the system described and illustrated in the aforementioned copending application Ser. No. 327,486. The unit shown in the drawings is composed of two identical halves, one shown in FIG. 1A and one shown in FIG. 1B, each primarily responsible for half the subscriber terminals in the overall system. One half of the unit (FIG. 1A) has been identified as Section A and the other half of the unit (FIG. 1B) has been identified as section B. The components in each half of the unit have been identified with reference characters "a" or "b" signifying in which half they are located. The entire subscriber services system polling unit is shown by placing FIGS. 1A and 1B alongside each other with corresponding connections aligned.

The subscriber services system polling unit shown in the drawings includes first and second microprocessor means for controlling the polling of subscriber terminals and for storing responses from the subscriber terminals. Such means may include microprocessors 10a and 10b, each primarily responsible for polling half the subscriber terminals of a system. In the embodiment of the invention being described, a maximum of 1,024 subscriber terminals are associated with each half of the unit.

Microprocessor 10a and 10b each control polling means for interrogating the respective subscriber terminals for which they are responsible and for receiving responses from these subscriber terminals. Such polling means may include a plurality of subscriber terminal interface modules 12a, 14a and 12b, 14b, and associated transmitter receiver modules 16a, 18a and 16b, 18b. Although seven lines are shown as leading to and from each subscriber terminal interface module with each line intended to indicate the handling of a distinct subscriber terminal, for the embodiment of the invention being described each subscriber terminal interface module can be connected with up to sixteen subscriber terminals. An assembly of subscriber terminal interface modules may include up to sixteen such units and this is represented by the dot-dash lines between subscriber terminal interface modules 12a and 14a and the dot-dash lines between subscriber terminal interface modules 12b and 14b. As a result, each assembly of sixteen subscriber terminal interface modules can handle 256 subscriber terminals, so that four such assemblies would be required for each section for the section to be able to handle 1,024 subscriber terminals.

Transmitter receiver modules 16a, 18a, 16b and 18b provide interrogation signals which are transmitted through the subscriber terminal interface modules to the subscriber terminals. An assembly of transmitter receiver modules may include up to four such units and this is represented by the dot-dash lines between transmitter receiver modules 16a and 18a and the dot-dash lines between transmitter receiver modules 16b and 18b. With each transmitter receiver module capable of interrogating any 128 subscriber terminals, eight such units in two assemblies of four each are required for each section for a section to be able to handle 1,024 subscriber terminals. The transmitter receiver modules are arranged in two assemblies of four each instead of one assembly of eight to permit selective partial replacement of an assembly of four in case of a limited malfunction in one section rather than a complete replacement of all eight which would be required if arranged as a single assembly of transmitter receiver modules. To further effect the desire to provide as flexible an arrangement as possible, the minimum number of transmitter receiver modules that would be included in each section of the unit would be two with each in a separate assembly.

The transmitter receiver modules and subscriber terminal interface modules in each section are interconnected in such a manner that any transmitter receiver module in one section may be selectively paired with any subscriber terminal interface module in the same section to interrogate one of the subscriber terminals associated with the particular subscriber terminal interface module. The selective pairings of the transmitter receiver modules and the subscriber terminal interface modules is achieved by controls from microprocessors 10a and 10b. The lines connecting the transmitter receiver modules and their associated subscriber terminal interface modules in the same section are intended to represent the pattern of interconnections between these units to acheive the desired operating relationship between these components. Actually, eight lines would emanate from each subscriber terminal interface module for connection to the associated transmitter receiver modules for a section handling 1,024 subscriber terminals.

Responses from the subscriber terminals are coupled to the transmitter receiver modules through the subscriber terminal interface modules. The two-direction arrows on the lines between the transmitter receiver modules and the subscriber terminal interface modules and the two direction arrows on the lines between the subscriber terminal interface modules and the subscriber terminals represent the transmission of interrogation signals originating at the transmitter receiver modules through the subscriber terminal interface modules to the subscriber terminals and the reception by the transmitter receiver modules of responses from the subscriber terminals which are conducted through the subscriber terminal interface modules.

Control of the transmitter receiver modules and the subscriber terminal interface modules to interrogate subscriber terminals and to receive responses from the subscriber terminals is effected by control signals from microprocessors 10a and 10b conducted by a plurality of primary interface means to the transmitter receiver modules and the subscriber terminal interface modules. Such means may include a first plurality of primary bus interface cards 20a, 22a associated with microprocessor 10a and a second pluarlity of primary bus interface cards 20b, 22b associated with microprocessor 10b. The primary bus interface cards serve a second purpose which will be described hereinafter. The dashed lines running through the primary bus interface cards dividing these components into two parts represents the two functions performed by these components, although the physical arrangement of elements for performing these functions are on the same primary bus interface card.

Each of the microprocessors 10a and 10b issue control signals which are conducted to the transmitter receiver modules and the subscriber terminal interface modules in their respective sections to cause selected transmitter receiver modules to issue interrogation signals to selected subscriber terminals. Bus 24a and arrows 26a, 28a, and 30a represent the transmission of control signals from microprocessor 10a to primary bus interface cards 20a and 22a. Bus 24b and arrows 26b, 28b, and 30b represent the transmission of control signals from microprocessor 10b to primary bus interface cards 20b and 22b.

Buses 32a and 34a and arrows 36a, 38a, 40a, and 42a represent the further transmission of control signals to the transmitter receiver modules and the subscriber terminal interface modules in Section A. Buses 32b and 34b and arrows 36b, 38b, 40b, and 42b represent the further transmission of control signals to the transmitter receiver modules and the subscriber terminal interface modules in Section B.

Polling of the subscriber terminals is performed by the first available transmitter receiver module. The polling priority of the subscriber terminals is based on selected operating criteria, such as the time of last poll of a given subscriber terminal and the response to the last poll from a given subscriber terminal. The control signals from the microprocessors effect the required pairings, within each section, of the transmitter receiver modules and the subscriber terminal interface modules to accomplish the desired polling of the selected subscriber terminals.

Responses from the subscriber terminals are conducted to the respective microprocessors through primary bus interface cards 20a and 20b. This is represented by buses 32a and 24a and arrows 36a, 38a, 28a and 26a and by buses 32b and 24b and arrows 36b, 38b, 28b and 26b.

One primary bus interface card (i.e. 20a or 20b) is associated with each assembly of four transmitter receiver modules and one primary bus interface card (i.e. 22a or 22b) is associated with each assembly of sixteen subscriber terminal interface modules. For a section responsible for 1,024 subscriber terminals, two primary bus interface cards are required for two assemblies of four transmitter receiver modules each and four primary bus interface cards are required for four assemblies of sixteen subscriber terminal interface modules each.

Each half of the subscriber services system polling unit further includes a plurality of secondary interface means for conducting control signals from the microprocessor in one section to the polling means in the other section and for conducting responses from the subscriber terminals received by these polling means to the microprocessor. Such means may include a first plurality of secondary bus interface cards 40a, 42a associated with microprocessor 10b and a second plurality of secondary bus interface cards 40b, 42b associated with microprocessor 10a. The secondary bus interface cards are identical in number and construction to the primary bus interface cards and serve the same purpose, except that the secondary bus interface cards connect the polling means of one section to the microprocessor in the other section, while the primary bus interface cards connect the polling means in one section to the microprocessor in the same section. Like the primary bus interface cards, the secondary bus interface cards serve a second purpose which also will be described hereinafter. The dashed lines running through the secondary bus interface cards dividing these components into two parts represents the two functions performed by these components, although the physical arrangement of elements for performing these functions are on the same secondary bus interface cards.

Bus 44a and arrows, 46a, 48b, and 50b represent the transmission of control signals from microprocessor 10a to secondary bus interface cards 40b and 42b. Bus 44b and arrows 46b, 48a, and 50a represent the transmission of control signals from microprocessor 10b to secondary bus interface cards 40a and 42a. Arrows 48b and 46a and bus 44a also represent the transmission of responses received by the transmitter receiver modules in Section B to microprocessor 10a. Arrows 48a and 46b and bus 44b also represent the transmission of responses received by transmitter receiver modules in Section A to microprocessor 10b.

Through the provision of the primary bus interface cards 20a, 22a, 20b and 22b and the secondary bus interface cards 40a, 42a, 40b, and 42b, the control signals from microprocessors 10a and 10b may be selectively conducted either through the primary bus interface cards in the respective sections of the microprocessors to control the polling of subscriber terminals for which the microprocessors are primarily responsible, or through the secondary bus interface cards in the other section to control the polling of subscriber terminals for which the other section is primarily responsible. Whatever the relationship between the microprocessors and the bus interface cards, the response from a subscriber terminal is conducted to that microprocessor which controls the polling of the particular subscriber terminal, so that the microprocessor which controls the polling of the subscriber terminal stores the response.

Microprocessors 10a and 10b may be operated in at least two modes. In one, the microprocessors are conditioned for automatic switching between the microprocessors and the polling means as the needs arise because of a malfunction in one section or the other. In the second mode, switching from one microprocessor to another may be accomplished manually, whether or not there is a need for one microprocessor to take over for the other because of a malfunction. A control status panel 52 is provided to establish the desired operating mode of the microprocessors. The controls effected by control status panel 52 on microprocessors 10a and 10b are represented by connnections 54a and 54b.

In the automatic mode, switching the control of the polling means from one microprocessor to the other may be accomplished by arranging the primary bus interface cards and the secondary bus interface cards to effect the desired switching in response to sensing the conditions under which switching should take place. Both the primary bus interface card and the secondary bus interface card for any particular assembly of transmitter receiver modules or subscriber terminal interface modules are conditioned to enable each to assume control over the components in their associated assembly, except that the primary bus interface card is conditioned to exercise priority of control. Interlocking is provided so that only one bus interface card may be in control of any assembly at any given time. Thus, when a primary bus interface card malfunctions or is directed by its associated microprocessor not to exercise control over its associated polling components, the secondary bus interface card for the particular assembly automatically takes over control of the polling components of the assembly.

Supervision of the bus interface cards which are excercising control of the respective polling components is accomplished by status signals conducted from the bus interface cards to microprocessors 10a and 10b. This is represented by connnections 56a and 58b leading from primary bus interface card 20a to microprocessors 10a and 10b, respectively, and connections 56b and 58a leading from primary bus interface card 20b to microprocessors 10b and 10a, respectively. Similarly, primary bus interface cards 22a and 22b and secondary bus interface cards 40a, 42a, 40b and 42b are connected to microprocessors 10a and 10b. This is represented by partial connections emanating from these bus interface cards. The complete connections between these components have not been shown in the drawing for the sake of clarity. However, it will be understood that these connections follow the pattern described with respect to primary bus interface cards 20a and 20b.

So long as the status signals from any primary bus interface card indicate that the primary bus interface card is excercising control over its associated polling components, the associated microprocessor continues to control the polling of the associated subscriber terminals. Whenever the status signals from any primary bus interface card indicate that this primary bus interface card is not exercising control over its associated polling components, either because of a malfunction or because its associated microprocessor has directed that control should not be assumed, the associated secondary bus interface card takes over control and microprocessors 10a and 10b receive indications of this switch in control by way of the status signals.

Various criteria may be used to establish the status of a primary bus interface card and the qualifications of this card to exercise control over its associated polling components. The nature and number of the criteria to be employed depend upon the operational variables of the unit which can affect the need or desire to switch control of the polling components to the other microprocessor and the desired degree of protection against these variables. For example, one requirement for a primary bus interface card to maintain control over its associated polling components may be that the associated microprocessor is fully operational to control the polling operations of these components. Another requirement may be that the primary bus interface card, in fact, has exercised control within a certain time period.

Whenever a primary bus interface card lacks the qualifications to maintain control of its associated polling components, it becomes non-operational and its associated secondary bus interface card, conditioned to control the polling components, is permitted to take over. In order for the secondary bus interface card to maintain control, it must issue status signals representing its qualifications to exercise control. In addition, the status signals from the secondary bus interface card preferably include an indication of the state of the associated primary bus interface card. Control of the polling components will be switched back whenever the primary bus interface card is ready to resume control over the associated polling components. Connections 60a, 60b, 62a and 62b represent the transmission of the status signals between associated primary bus interface cards and secondary bus interface cards.

Connection 64 between microprocessors 10a and 10b represents the exchanges between the microprocessors of responses from the subscriber terminals, whereby responses received and stored by each microprocessor also are stored by the other microprocessor. As a result, each microprocessor stores all responses from the subscriber terminals, including those polled under its control and those polled under the control of the other microprocessor. In this way, if and when one microprocessor takes over from the other, it already has in its storage the history of responses received from those subscriber terminals previously polled under the control of the other microprocessor.

In summary, the present invention provides a polling unit arranged in two parts, with each part primarily responsible for a portion of the subscriber terminals being polled but capable of assuming responsibility for polling all of the subscriber terminals in the system. Accordingly, the appended claims are directed to this mode of operation. Neither the details of the particular components shown in block form in FIGS. 1A and 1B, nor specific operating procedures, such as establishment of the priority of polling subscriber terminals, form part of the invention.

I claim:

1. A subscriber services system polling unit comprising:

first and second microprocessor means for controlling the polling of subscriber terminals and for storing responses from said subscriber terminals, said first microprocessor means being primarily responsible for polling a first portion of said subscriber terminals and secondarily responsible for polling a second portion of said subscriber terminals, and said second microprocessor means being primarily responsible for polling said second portion of said subscriber terminals and secondarily responsible for polling said first portion of said subscriber terminals;

first polling means for interrogating said first portion of said subscriber terminals and for receiving responses from said first portion of said subscriber terminals;

second polling means for interrogating said second portion of said subscriber terminals and for receiving responses from said second portion of said subscriber terminals;

a first plurality of primary interface means for conducting control signals from said first microprocessor means to said first polling means to control operation of said first polling means by said first microprocessor means and for conducting responses from said first portion of said subscriber terminals to said first microprocessor means;

a second plurality of primary interface means for conducting control signals from said second microprocessor means to said second polling means to control operation of said second polling means by said second microprocessor means and for conducting responses from said second portion of said subscriber terminals to said second microprocessor means;

a first plurality of secondary interface means for conducting control signals from said first microprocessor means to said second polling means to control operation of said second polling means by said first microprocessor means and for conducting responses from said second portion of said subscriber terminals to said first microprocessor means;

a second plurality of secondary interface means for conducting control signals from said second microprocessor means to said first polling means to control operation of said first polling means by said second microprocessor means and for conducting responses from said first portion of said subscriber terminals to said second microprocessor means;

and switching means for selectively conducting said control signals from said first and second microprocessor means to said first and second polling means through said first and second pluralities of primary interface means and said first and second pluralities of secondary interface means.

2. A subscriber services system polling unit according to claim 1 further including means for coupling together said first and second microprocessor means for storing in each of said microprocessor means all responses from both said first and second portions of said subscriber terminals.

3. A subscriber services system polling unit according to claim 2 wherein said first polling means and said second polling means each include (a) a plurality of transmitter receiver means for supplying interrogation signals to interrogate said subscriber terminals and for receiving responses from said subscriber terminals, and (b) a plurality a subscriber terminal interface means for conducting said interrogation signals to said subscriber terminals and for conducting said reponses to said transmitter receiver means.

4. A subscriber services system polling unit according to claim 3 wherein said transmitter receiver means are arranged in assemblies of a prescribed number of such means and said subscriber terminal interface means are arranged in assemblies of a prescribed number of such means.

5. A subscriber services system polling unit according to claim 4 wherein one primary interface means and one secondary interface means is associated with each assembly of said transmitter receiver means and each assembly of said subscriber terminal interface means.

6. A subscriber services system polling unit according to claim 5 wherein said switching means include a plurality of primary control means associated with said plurality of primary interface means and a plurality of secondary control means associated with said plurality of secondary interface means, said primary control means and said secondary control means for (a) establishing conditions under which said control signals from said microprocessor means are conducted to either said first polling means or said second polling means, (b) sensing the existence of said conditions, and (c) controlling the conducting of said control signals through said primary interface means or said secondary interface means according to the sensed conditions.

* * * * *